(12) United States Patent
Racz et al.

(10) Patent No.: US 12,411,974 B2
(45) Date of Patent: Sep. 9, 2025

(54) SYSTEMS FOR MANDATORY ACCESS CONTROL OF SECURED HIERARCHICAL DOCUMENTS AND RELATED METHODS

(71) Applicant: GENETEC INC., Saint-Laurent (CA)

(72) Inventors: Pierre Racz, Montreal (CA); Christian Chenard Lemire, Pointe-Claire (CA); Patrick Seidler, Cracow (PL)

(73) Assignee: GENETEC INC.

( * ) Notice: Subject to any disclaimer, the term of this patent is extended or adjusted under 35 U.S.C. 154(b) by 191 days.

(21) Appl. No.: 17/975,015

(22) Filed: Oct. 27, 2022

(65) Prior Publication Data
US 2024/0143821 A1 May 2, 2024

(51) Int. Cl.
*G06F 21/62* (2013.01)

(52) U.S. Cl.
CPC .. *G06F 21/6227* (2013.01); *G06F 2221/2113* (2013.01)

(58) Field of Classification Search
CPC ............. G06F 21/6227; G06F 2221/2113
See application file for complete search history.

(56) References Cited

U.S. PATENT DOCUMENTS

| | | | |
|---|---|---|---|
| 9,405,929 B1 | 8/2016 | Van Rotterdam et al. | |
| 9,870,483 B2 | 1/2018 | Cotner et al. | |
| 11,132,459 B1 * | 9/2021 | Lim | G06F 21/604 |
| 11,392,714 B1 * | 7/2022 | Matthews | H04L 9/0894 |
| 11,769,577 B1 * | 9/2023 | Dods | G16H 20/10 |
| | | | 705/50 |
| 11,803,650 B1 * | 10/2023 | Hocanin | G06F 16/221 |
| 11,818,156 B1 * | 11/2023 | Parikh | G06F 16/9537 |
| 2003/0196108 A1 * | 10/2003 | Kung | H04L 9/3268 |
| | | | 713/175 |
| 2004/0078577 A1 | 4/2004 | Feng et al. | |
| 2005/0138109 A1 * | 6/2005 | Redlich | G06F 21/6272 |
| | | | 709/201 |

(Continued)

OTHER PUBLICATIONS https://objectsecurity.com/about-openpmf/.

(Continued)

*Primary Examiner* — Stephen T Gundry
(74) *Attorney, Agent, or Firm* — NORTON ROSE FULBRIGHT CANADA

(57) ABSTRACT

Methods, systems, and computer-readable media for generating a secured hierarchical document are described herein. A hierarchical document is obtained and is processed to generate a secured hierarchical document. A security label is applied to each node in the hierarchical document. The secured hierarchical document is generated by cryptographically segregating the nodes according to the security label of each node. The secured hierarchical document comprises a plurality of encrypted layers. Each encrypted layer comprises at least a subset nodes associated with a respective security label and encrypted with a respective encryption key. The secured hierarchical document is stored to computer-readable memory. Methods, systems, and computer-readable media for searching a corpus of secured hierarchical documents indexed in an index as sensitive information by a computing entity trusted to have access to the sensitive information in the index are also described herein.

12 Claims, 9 Drawing Sheets

(56) References Cited

U.S. PATENT DOCUMENTS

| | | | |
|---|---|---|---|
| 2008/0071814 | A1 | 3/2008 | Mittal et al. |
| 2008/0168135 | A1* | 7/2008 | Redlich ............... G06F 21/6218 709/204 |
| 2011/0145593 | A1* | 6/2011 | Auradkar .............. H04L 9/0833 713/189 |
| 2012/0203752 | A1 | 8/2012 | Ha-Thuc et al. |
| 2014/0365527 | A1* | 12/2014 | Fuchs ................. G06F 21/6227 707/786 |
| 2016/0314169 | A1 | 10/2016 | Wenzler |
| 2019/0278929 | A1* | 9/2019 | Kakumani .......... G06F 16/2246 |
| 2021/0185093 | A1 | 6/2021 | Pollitt et al. |
| 2023/0289455 | A1* | 9/2023 | White ................... G06F 16/213 |
| 2023/0289736 | A1* | 9/2023 | Stewart .............. G06Q 10/1053 |
| 2023/0367891 | A1* | 11/2023 | Joshi ...................... G06F 21/62 |
| 2023/0421377 | A1* | 12/2023 | Jakobsson ................. H04L 9/50 |
| 2023/0421554 | A1* | 12/2023 | Richards ............. H04L 63/0823 |
| 2024/0114012 | A1* | 4/2024 | Venkatesan ........... H04L 63/105 |
| 2024/0129332 | A1* | 4/2024 | Geil ................... G06F 16/2246 |
| 2024/0202363 | A1* | 6/2024 | Mehta ................. G06F 21/6245 |

OTHER PUBLICATIONS https://objectsecurity.com/products/openpmf-auditor/.
https://www.json.org/json-en.html.
https://www.w3schools.com/xml/.
https://www.w3schools.com/xml/xml_tree.asp.
https://en.wikipedia.org/wiki/Standard_Generalized_Markup_Language.
https://onlinelibrary.wiley.com/doi/abs/10.1002/int.22810.
https://reference.niem.gov/niem/guidance/user-guide/vol1/user-guide-vol1.pdf.

\* cited by examiner

SYSTEMS FOR MANDATORY ACCESS CONTROL OF SECURED HIERARCHICAL DOCUMENTS AND RELATED METHODS

TECHNICAL FIELD

The present disclosure relates generally to mandatory access control, and, more particularly, to systems and methods for mandatory access control of secured hierarchical documents.

BACKGROUND

Sharing information between different organizations or different people/departments within an organization can allow for collaboration that can improve overall security or function. For example, it could be useful for law enforcement organizations to share criminal investigation reports with each other in order to be informed of pertinent information relevant to their investigations without divulging information that could jeopardize an ongoing investigation. By way of another example, one department with a certain security clearance may want to share information in classified documents with another department within the same organization having a different security clearance in order for the different departments to fulfill their roles within the organization. When it comes to sharing sensitive and/or classified information it is important to maintain control of who can and cannot access certain information. Mandatory access control can be used for restricting access to documents based on the sensitivity of the information in the documents and the security clearance of users accessing the documents.

However, a problem with mandatory access control, and access control in general, is that failures can occur. As such, there is a need for more robust control mechanisms that can assure the prevention of subversion at a level suitable to enforce security requirements mandated by governments and/or other organizations.

SUMMARY

The present disclosure describes a robust mandatory access control mechanism for hierarchical documents. As a hierarchical document is ingested into the access control system, it is processed to identifying nodes within the document, as the document has data encoded therein that is interpretable as nodes in a tree-like structure (e.g., as in XML, JSON, etc.). The nodes can refer to other nodes within the document or can be leaf nodes that contain scalar data. Security labels can be applied to the nodes based on security policies that may be created by a security policy administrator. The incoming hierarchical documents can be formatted according to a known schema, which ultimately specifies which nodes are in a document and what type of information is to be stored in each node or which nodes point to other nodes. Accordingly, security policies can be document-type specific. For example, criminal investigation reports may be known to have its nodes formatted in a specific manner, and a security policy for criminal investigation reports can be created to label these known nodes with different classifications. However, criminal investigation reports may be treated differently depending on the source. For example, crime reports from a local sheriffs department could be treated differently that crimes reports from the FBI. Accordingly, security policies can be source specific. The security labels can include security levels, for example, such as public, confidential, secret and top secret. The security level classifications can be specific to compartments, as not all classified information crosses domains. Accordingly, the security labels can include compartments, such as biologic, nuclear, etc. The security labels can also include other attributes such as type of information and role. Security labels can read down from a parent node to a child node, but a child node's label would not read up to its parent node. For example, a parent node can be labelled top secret, and its child leaf node could inherit this security label, but if the child leaf node is labelled as public, it wouldn't apply to the top secret parent node.

The incoming hierarchical document is separated into different layers of sensitive information visible at each layer and each layer is encrypted with a separate cryptographic lens to generate a cryptographically segregated hierarchical document, referred to as a secured hierarchical document. In particular, the nodes of the hierarchical document are separated into layers according to the security labels applied to each node. For example, nodes labelled confidential could be encrypted with one encryption key and nodes labelled secret, and their child nodes labelled confidential, could be encrypted with another, different, encryption key. By way of another example, nodes labelled with a secret security level and a nuclear compartment are encrypted with a first encryption key, nodes labelled with a top secret security level and a biologic compartment are encrypted with a second encryption key, and nodes labelled with a confidential security level and no compartment are encrypted with a third encryption key. The secured hierarchical document can be stored to memory for latter retrieval, and can only be access on a layer-by-layer basis by decrypting a given encrypted layer with the appropriate decryption key held or accessible by a user or computing entity with the corresponding security clearance of that layer.

The secured hierarchical document can be stored to one or more indexes. For example, a common index can be used to store secured hierarchical documents. By way of another example, each encrypted layer corresponds to a respective index. As the secured hierarchical document are stored to the index(es) in plaintext, the number of indexes and how the indexes are created depends on the level of trust in the server or database on which the indexes reside. As such the indexes may be created with no relationship to the security labels and encrypted layers. Each index can have a clearance level associated therewith based on the level of trust in the server or database on which each index resides. Each indexing system (e.g., a server with access to an index) is able to decrypt the encrypted layers of the secured hierarchical documents that it has access to the corresponding decryption key to index the information in plaintext in a database or other data structure (e.g., a fusion stream, for example, as described in U.S. patent Ser. No. 11/397,824, the contents of which are hereby incorporated by reference).

A user, which has been authenticated and is a security cleared member of an authorized organization, can query a secured information index. For example, the user may be an analyst that provides one or more search terms to search for documents that may be relevant for an ongoing criminal investigation. However, the index may include information at a higher security level than that of the user. For example, the index can store top secret level information and lower, and the user only has a secret clearance level. In other words, the index can have the same clearance level of the user or higher. The user may have a token to access the index, which can indicate that the user is authorized to access this index and the security clearance of the user. Once the index is queried, a result set of secured hierarchical documents are obtained. However, the result set can contain information at a sensitively level that the user does not have. As such, the result set is filtered for the security clearance of the user before being provided to the user. For example, some of the result set will not show up in the results provided to the user. Some of the results may be redacted before being provided to the user. For instance, the fact that information has been redacted may not be made aware to the user. The user's query may be logged, which can include applying a security label to the log entry and indexing the query event with the security label an index.

In accordance with an aspect of the present disclosure, there is provided a computer-implemented method for generating a secured hierarchical document. The method comprises: obtaining a hierarchical document having encoded therein data interpretable as a plurality of nodes in a tree-like structure; processing the hierarchical document to generate the secured hierarchical document, wherein said processing includes: associating a security label to each node of the plurality of nodes in the hierarchical document, the security label associated with each node corresponds to one of a plurality of security labels, each security label of the plurality of security labels includes a security clearance level of a plurality of security clearance levels; and generating the secured hierarchical document by cryptographically segregating the plurality of nodes according to the security label of each node, the secured hierarchical document comprising a plurality of encrypted layers, each encrypted layer of the plurality of encrypted layers comprises a subset of the plurality of nodes associated with at least a respective security label of the plurality of security labels and encrypted with a respective encryption key of a plurality of encryption keys; and storing the secured hierarchical document in computer-readable memory.

In accordance with an aspect of the present disclosure, there is provided a system for generating a secured hierarchical document. The system comprises at least one processor, and at least one non-transitory computer-readable memory having stored thereon program instructions. The program instructions executable by the at least one processor for: obtaining a hierarchical document having encoded therein data interpretable as a plurality of nodes in a tree-like structure; processing the hierarchical document to generate the secured hierarchical document, wherein said processing includes: associating a security label to each node of the plurality of nodes in the hierarchical document, the security label associated with each node corresponds to one of a plurality of security labels, each security label of the plurality of security labels includes a security clearance level of a plurality of security clearance levels; and generating the secured hierarchical document by cryptographically segregating the plurality of nodes according to the security label of each node, the secured hierarchical document comprising a plurality of encrypted layers, each encrypted layer of the plurality of encrypted layers comprises a subset of the plurality of nodes associated with at least a respective security label of the plurality of security labels and encrypted with a respective encryption key of a plurality of encryption keys; and storing the secured hierarchical document in computer-readable memory.

In accordance with an aspect of the present disclosure, there is provided a non-transitory computer-readable storage medium having stored thereon program instruction which, when executed, cause at least one processor to obtain a hierarchical document having encoded therein data interpretable as a plurality of nodes in a tree-like structure; process the hierarchical document to generate the secured hierarchical document, including: associating a security label to each node of the plurality of nodes in the hierarchical document, the security label associated with each node corresponds to one of a plurality of security labels, each security label of the plurality of security labels includes a security clearance level of a plurality of security clearance levels; and generating the secured hierarchical document by cryptographically segregating the plurality of nodes according to the security label of each node, the secured hierarchical document comprising a plurality of encrypted layers, each encrypted layer of the plurality of encrypted layers comprises a subset of the plurality of nodes associated with at least a respective security label of the plurality of security labels and encrypted with a respective encryption key of a plurality of encryption keys; and store the secured hierarchical document in computer-readable memory.

In some embodiments, each security label in a subset of the plurality of security labels associated with one or more nodes of the plurality of nodes includes a compartment of a plurality of compartments. In some embodiments, each security label in the subset further includes at least one attribute, wherein the at least one attribute comprises at least one information type of a plurality of information types and/or at least one role of a plurality of roles. In some embodiments, associating the security label to each node of the plurality of nodes is based on one or more policies. In some embodiments, each node of the plurality of nodes is associated with a respective node name, and wherein associating the security label to each node of the plurality of nodes comprises assigning from the one or more policies a respective security label associated with the respective node name.

In some embodiments, the method further comprises: identifying a document type from the hierarchical document; and obtaining the one or more polices based on the document type, wherein the one or more policies apply for at least the document type. In some embodiments, the program instructions are further executable by the at least one processor for identifying a document type from the hierarchical document; and obtaining the one or more polices based on the document type, wherein the one or more policies apply for at least the document type. In some embodiments, the program instruction which, when executed, cause the at least one processor to identify a document type from the hierarchical document; and obtain the one or more polices based on the document type, wherein the one or more policies apply for at least the document type.

In some embodiments, the method further comprises: identifying a source type of the hierarchical document from which the hierarchical document originated therefrom; and obtaining the one or more polices based on the source type, wherein the one or more policies apply for at least the source type. In some embodiments, the program instructions are further executable by the at least one processor for identifying a source type of the hierarchical document from which the hierarchical document originated therefrom; and obtaining the one or more polices based on the source type, wherein the one or more policies apply for at least the source type. In some embodiments, the program instruction which, when executed, cause the at least one processor to identify a source type of the hierarchical document from which the hierarchical document originated therefrom; and obtain the one or more polices based on the source type, wherein the one or more policies apply for at least the source type.

In some embodiments, storing the secured hierarchical document comprises indexing the secured hierarchical document in at least one index of a plurality of secured hierarchical documents. In some embodiments, the program instructions executable by the at least one processor for storing the secured hierarchical document comprises indexing the secured hierarchical document in at least one index of a plurality of secured hierarchical documents. In some embodiments, the program instruction which, when executed, cause the at least one processor to store the secured hierarchical document comprises program instruction which, when executed, cause the at least one processor to index the secured hierarchical document in at least one index of a plurality of secured hierarchical documents.

In some embodiments, indexing the secured hierarchical document comprises indexing the secured hierarchical document in a plurality of indexes, wherein each index in the plurality of index is associated with a level of trust for storing information at a given security clearance level of the plurality of security clearance levels. In some embodiments, the program instructions executable by the at least one processor for indexing the secured hierarchical document comprises indexing the secured hierarchical document in a plurality of indexes, wherein each index in the plurality of index is associated with a level of trust for storing information at a given security clearance level of the plurality of security clearance levels. In some embodiments, the program instruction which, when executed, cause the at least one processor to index the secured hierarchical document comprises program instruction which, when executed, cause the at least one processor to index the secured hierarchical document in a plurality of indexes, wherein each index in the plurality of index is associated with a level of trust for storing information at a given security clearance level of the plurality of security clearance levels.

In some embodiments, said processing further includes: generating at least one pseudonymized node for the plurality of nodes, the at least one pseudonymized node corresponding to at least one node of the plurality of nodes having personally identifiable information therein modified. In some embodiments, the program instructions executable by the at least one processor for said processing further include program instructions executable by the at least one processor for generating at least one pseudonymized node for the plurality of nodes, the at least one pseudonymized node corresponding to at least one node of the plurality of nodes having personally identifiable information therein modified. In some embodiments, the program instruction which, when executed, cause the at least one processor to process include program instruction which, when executed, cause the at least one processor to generate at least one pseudonymized node for the plurality of nodes, the at least one pseudonymized node corresponding to at least one node of the plurality of nodes having personally identifiable information therein modified.

In some embodiments, said processing further includes: associating at least one security label to the at least one pseudonymized node based on one or more policies. In some embodiments, the program instructions executable by the at least one processor for said processing include program instructions executable by the at least one processor for associating at least one security label to the at least one pseudonymized node based on one or more policies. In some embodiments, the program instruction which, when executed, cause the at least one processor to process include program instruction which, when executed, cause the at least one processor to associate at least one security label to the at least one pseudonymized node based on one or more policies.

In some embodiments, the method further comprising associating a document-level security label to the secured hierarchical document. In some embodiments, the program instructions are further executable by the at least one processor for associating a document-level security label to the secured hierarchical document. In some embodiments, the program instruction which, when executed, cause the at least one processor to associate a document-level security label to the secured hierarchical document.

In accordance with an aspect of the present disclosure, there is provide a computer-implemented method for searching a corpus of documents with different portions have different security levels. The method is performed by a computing entity having access to the corpus and an index of the corpus. The method comprises: receiving, at the computing entity, a search request from a computing device associated with a user having a security clearance defining one or more security levels of data that the user is authorized to access; generating, by the computing entity, an adapted result set of documents adapted to the security clearance of the user by querying the index based at least in part on the search request to identify documents corresponding to the search request and compiling the portions of the identified documents that are associated with the one or more security levels of data that the user is authorized to access; and transmitting, by the computing entity, the adapted result set of documents to the computing device.

In accordance with an aspect of the present disclosure, there is provided a computing entity for searching a corpus of documents with different portions have different security levels. The computing entity has access to the corpus and an index of the corpus. The computing entity comprises at least one processor, and at least one non-transitory computer-readable memory having stored thereon program instructions. The program instructions executable by the at least one processor for receiving, at the computing entity, a search request from a computing device associated with a user having a security clearance defining one or more security levels of data that the user is authorized to access; generating, by the computing entity, an adapted result set of documents adapted to the security clearance of the user by querying the index based at least in part on the search request to identify documents corresponding to the search request and compiling the portions of the identified documents that are associated with the one or more security levels of data that the user is authorized to access; and transmitting, by the computing entity, the adapted result set of documents to the computing device.

In accordance with an aspect of the present disclosure, there is provided a non-transitory computer-readable storage medium having stored thereon program instruction which, when executed, cause at least one computing entity to receive a search request from a computing device associated with a user having a security clearance defining one or more security levels of data that the user is authorized to access; generate an adapted result set of documents adapted to the security clearance of the user by querying an index based at least in part on the search request to identify documents corresponding to the search request and compiling the portions of the identified documents that are associated with the one or more security levels of data that the user is authorized to access; and transmit the adapted result set of documents to the computing device.

In some embodiment, the index comprises information at a plurality of security clearance levels, and wherein at least one security clearance level of the plurality of security clearance levels is not one of the one or more security levels of data that the user is authorised to access.

In some embodiments, generating the adapted result set includes redacting portions of the identified documents having information at a security level not within the one or more security levels of data that the user is authorised to access. In some embodiments, the program instructions executable by the at least one processor for generating the adapted result set include program instructions executable by the at least one processor for redacting portions of the identified documents having information at a security level not within the one or more security levels of data that the user is authorised to access. In some embodiments, the program instruction which, when executed, cause the computing entity to generate the adapted result set include program instruction which, when executed, cause the computing entity to redact portions of the identified documents having information at a security level not within the one or more security levels of data that the user is authorised to access.

In some embodiments, said redacting is based on one or more security labels associated with one or more nodes in the one or more identified documents. In some embodiments, the program instruction which, when executed, cause the computing entity to redact portions of the identified documents based on one or more security labels associated with one or more nodes in the one or more identified documents.

In some embodiments, generating the adapted result set comprises: generating an initial result set of documents by said querying the index based on the search request; and generating a redacted result set by redacting the initial result set to omit the portions of the identified documents having information at the security level not within the one or more security levels of data that the user is authorised to access. In some embodiments, the program instructions executable by the at least one processor for generating the adapted result set comprises program instructions executable by the at least one processor for generating an initial result set of documents by said querying the index based on the search request; and generating a redacted result set by redacting the initial result set to omit the portions of the identified documents having information at the security level not within the one or more security levels of data that the user is authorised to access. In some embodiments, the program instruction which, when executed, cause the computing entity to generate the adapted result set comprises program instructions executable by the computing entity to generate an initial result set of documents by said querying the index based on the search request; and generate a redacted result set by redacting the initial result set to omit the portions of the identified documents having information at the security level not within the one or more security levels of data that the user is authorised to access.

In some embodiments, generating the adapted result set includes removing from the identified documents at least one document having a document-level security label at a security level not within the one or more security levels of data that the user is authorised to access. In some embodiments, the program instructions executable by the at least one processor for generating the adapted result set include program instructions executable by the at least one processor for removing from the identified documents at least one document having a document-level security label at a security level not within the one or more security levels of data that the user is authorised to access. In some embodiments, the program instruction which, when executed, cause the computing entity to generate the adapted result set include program instruction which, when executed, cause the computing entity to remove from the identified documents at least one document having a document-level security label at a security level not within the one or more security levels of data that the user is authorised to access.

In some embodiments, generating the adapted result set comprises: generating an initial result set of documents by said querying the index based on the search request; and generating a redacted result set by removing from the initial result set the at least one document in the initial result set having the document-level security label at the security level not within the one or more security levels of data that the user is authorised to access. In some embodiments, the program instructions executable by the at least one processor for generating the adapted result set comprise program instructions executable by the at least one processor for generating an initial result set of documents by said querying the index based on the search request; and generating a redacted result set by removing from the initial result set the at least one document in the initial result set having the document-level security label at the security level not within the one or more security levels of data that the user is authorised to access. In some embodiments, the program instruction which, when executed, cause the computing entity to generate the adapted result set comprises program instruction which, when executed, cause the computing entity to generate an initial result set of documents by said querying the index based on the search request; and generate a redacted result set by removing from the initial result set the at least one document in the initial result set having the document-level security label at the security level not within the one or more security levels of data that the user is authorised to access.

In some embodiments, generating the adapted result set comprises obtaining at least one secured hierarchical document comprising a plurality of encrypted layers from a data repository based on at least one association in the index that maps plaintext sensitive information therein to the at least one secured hierarchical documents in the data repository. In some embodiments, the program instructions executable by the at least one processor for generating the adapted result set comprise program instructions executable by the at least one processor for obtaining at least one secured hierarchical document comprising a plurality of encrypted layers from a data repository based on at least one association in the index that maps plaintext sensitive information therein to the at least one secured hierarchical documents in the data repository. In some embodiments, the program instruction which, when executed, cause the computing entity to generate the adapted result set comprise program instruction which, when executed, cause the computing entity to obtain at least one secured hierarchical document comprising a plurality of encrypted layers from a data repository based on at least one association in the index that maps plaintext sensitive information therein to the at least one secured hierarchical documents in the data repository.

In some embodiments, generating the adapted result set includes relabelling at least one of the portions of at least one of the identified documents. In some embodiments, the program instructions executable by the at least one processor for generating the adapted result set include program instructions executable by the at least one processor for relabelling at least one of the portions of at least one of the identified documents. In some embodiments, the program instruction which, when executed, cause the computing entity to generate the adapted result set include program instruction which, when executed, cause the computing entity to relabel at least one of the portions of at least one of the identified documents.

In some embodiments, generating the adapted result set includes redacting information from the identified documents without any indication in the adapted result set that such redacting has occurred. In some embodiments, the program instructions executable by the at least one processor for generating the adapted result set include program instructions executable by the at least one processor for redacting information from the identified documents without any indication in the adapted result set that such redacting has occurred. In some embodiments, the program instruction which, when executed, cause the computing entity to generate the adapted result set include program instruction which, when executed, cause the computing entity to redact information from the identified documents without any indication in the adapted result set that such redacting has occurred.

In some embodiments, the method further comprises logging a query event corresponding to said querying of the at least one index as a log entry in computer-readable memory. In some embodiments, the program instructions are further executable by the at least one processor for logging a query event corresponding to said querying of the at least one index as a log entry in computer-readable memory. In some embodiments, the program instruction which, when executed, cause the computing entity to log a query event corresponding to said querying of the at least one index as a log entry in computer-readable memory.

In some embodiments, the method further comprising: applying a security label to the log entry prior to storing in the computer-readable memory, the security label applied to the log entry for assigning a security level to the log entry to that of said querying. In some embodiments, the program instructions are further executable by the at least one processor for applying a security label to the log entry prior to storing in the computer-readable memory, the security label applied to the log entry for assigning a security level to the log entry to that of said querying. In some embodiments, the program instruction which, when executed, cause the computing entity to apply a security label to the log entry prior to storing in the computer-readable memory, the security label applied to the log entry for assigning a security level to the log entry to that of said querying.

In some embodiments, logging the query event comprises indexing the log entry in an index of log entries based on the security level of the log entry. In some embodiments, the program instructions executable by the at least one processor for logging the query event comprise program instructions executable by the at least one processor for indexing the log entry in an index of log entries based on the security level of the log entry. In some embodiments, the program instruction which, when executed, cause the computing entity to log the query event comprises program instruction which, when executed, cause the computing entity to index the log entry in an index of log entries based on the security level of the log entry Any of the above features may be used together in any suitable combination.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
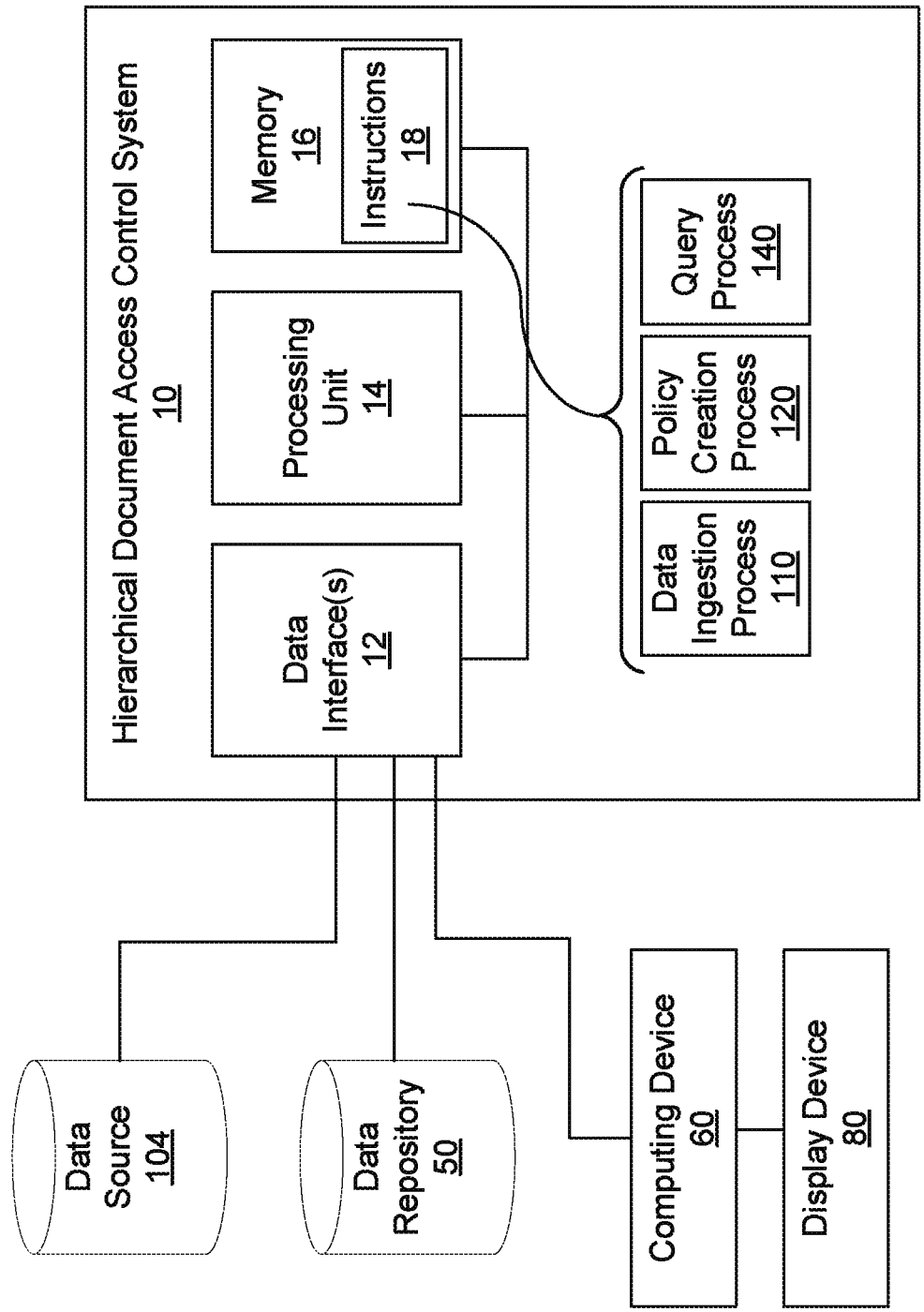
FIG. 1 is a schematic diagram of an example environment illustrating a hierarchical document access control system, in accordance with one or more embodiments.

With reference to FIG. 1, there is illustrated an example environment with a hierarchical document access control system 10. In general, the hierarchical document access control system 10 provides a robust mechanism for mandatory access control of hierarchical documents. The access control system 10, when queried, is configured to provide a redacted result set of secured hierarchical documents according to a user's security clearance. For example, a user can interact with the access control system 10 via a computing device 60 to cause the system 10 to run a query process 140 to receive the redacted result set of secured hierarchical documents from one or more indexes stored in the data repository 50. The indexes can be populated by a data ingestion process 110 which ingests hierarchical documents from a data source 104 and generates secured hierarchical documents by applying security labels according to security policies and cryptographically segregating the documents based on the applied security labels. As the data ingestion process 110 is policy driven, the access control system 10 is able to implement a policy creation process 120, to define the security policies. The abovementioned and other features of the access control system 10 are further described herein.

Data Ingestion Process

Figure 2:
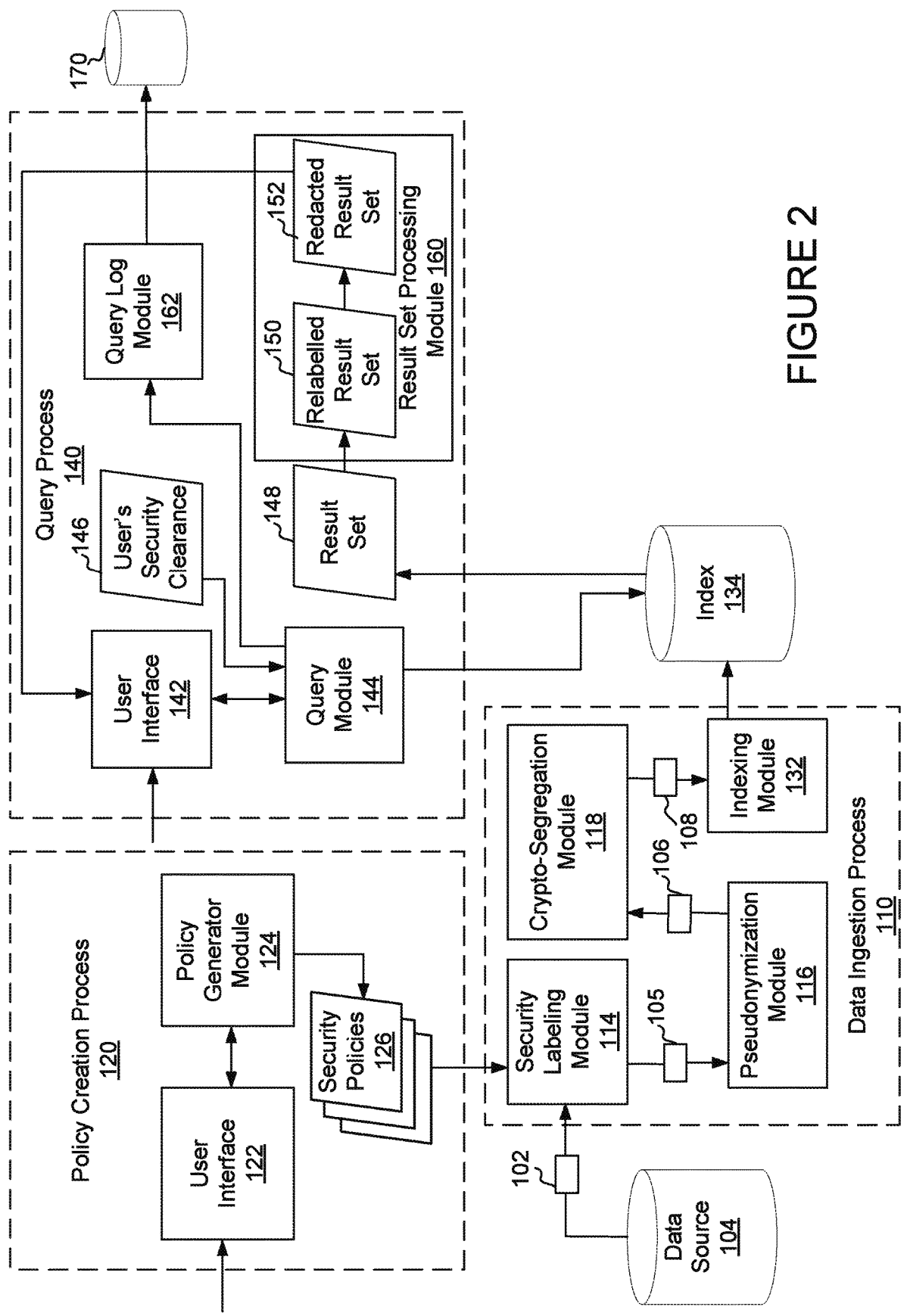
FIG. 2 is a schematic diagram illustrating an example implementation of the hierarchical document access control system of FIG. 1, in accordance with one or more embodiments.

With additional reference to FIG. 2, an example of the hierarchical document access control system 10 is illustrated. The data ingestion process 110 receives a hierarchical document 102 from a data source 104. The hierarchical document has encoded therein data interpretable as nodes in a tree-like structure (e.g., XML, JSON, etc.). The hierarchical document 102 can be marked-up with semantic information in any suitable manner such that it can be interpreted as nodes. For example, the hierarchical document 102 may be a formatted according to the National Information Exchange Model (NIEM), for example, as specified in the NIEM User Guide, Volume 1, the contents of which are hereby incorporated by reference. Each node in the hierarchical document 102 can reference another node, referred to as a "child node", or can be a node without any children, referred to as a "leaf node". In general, a node can contain data or can point to another node. For example, as in the case of XML, a node can correspond to an element, which may have one or more attributes, which may also be represented by one or more leaf nodes. An element is a logical document component and can contain content such as text, attributes (e.g., leaf nodes), other elements (e.g., other nodes), or a combination of the above. An attribute describes the characteristic of a corresponding element. A given node can be referred to as a named node and it can comprise a name-value pair. The name-value pair is also commonly referred to as attribute-value pair, key-value pair, or field-value pair.

A security labeling module 114 processes the hierarchical document 102 to apply security labels to the nodes of the hierarchical document 102 and optionally to the hierarchical document 102 itself, thereby forming a security-labelled hierarchical document 105. Each node of the security-labelled hierarchical document then has directly or indirectly at least one security label. Each security label can include a security level indicative of who can access certain types of data within the document. The security labels can also include compartments and/or other attributes, such as information type and role. The compartments can specify the domain at which node pertains thereto (e.g., nuclear, biologic, etc.). The information type specifies the type of information in the node. The types can represent the things in the nodes. The roles can represent the different roles that a type plays in in relationship with other types. The applying of the security labels is policy-driven, as it is based on security policies 126. The security policies 126 can be document-source and/or document-type specific. The node name, e.g., from the name-value pair, can be used to apply the security labels. The security policies can specify for which node name, what security label is to apply to that node. Accordingly, the security-labelled hierarchical document 105 can have different portions have different security levels. For example, nodes labelled with a secret security level and a nuclear compartment may correspond to a first portion, nodes labelled with a top secret security level and a biologic compartment may correspond to a second portion, and nodes labelled with a confidential security level and no compartment may correspond to a third portion.

A pseudonymization module 116 processes the security-labelled hierarchical document 105 to generate a pseudonymized security-labelled hierarchical document 106. The pseudonymized security-labelled hierarchical document 106 includes the original nodes of the security-labelled hierarchical document 105, but additionally includes at least one node that has pseudonymized content. The pseudonymized node corresponds to the original node but where data has at least in part been pseudonymized (e.g., age in changed to range or indicates minor; full name is replaced with first name; address is changed to neighbourhood, etc.). The nodes that have been pseudonymized may also include in addition to the original security label(s), a pseudonymized security label indicative of who can access the pseudonymized node. The pseudonymization may be based on the security policies, the security labels, and/or pseudonymization policies. For example, a given policy may indicate that nodes of a given node name may contain personally identifiable information, a node can then be label with a label indicating that it could contain personally identifiable information, which may be further processed based on the applied label to replicate the node with the personally identifiable information modified such that the information is no longer personally identifiable. The node with personally identifiable information may be labelled with a higher security level than that of the corresponding pseudonymized node with the personally identifiable information pseudonymized.

The pseudonymized security-labelled hierarchical document 106 (or the security-labelled hierarchical document 105, when there are no nodes in the security-labelled hierarchical document 105 that are pseudonymized) is crypto-segregated according to the security labels by the crypto-segregation module 118 to generate a crypto-segregated hierarchical document 108, herein referred to as a "secured hierarchical document". The secured hierarchical document 108 has encrypted layers, where each encrypted layer includes at least nodes associated with a corresponding security label and is encrypted with an encryption key for that security label. Each layer can include nodes associated with a corresponding security level. Each layer can include nodes associated with multiple security levels. The secured hierarchical document 105 can have different portions have different security levels. Each portion can correspond to a subset of the nodes in secured hierarchical document 108 corresponding to a particular security label and/or security level.

The secured hierarchical document 108 is indexed in an index 134 by an indexing module 132. The secured hierarchical document 108 is indexed in the index 134 in plaintext such that the sensitive information secured within the secured hierarchical document 108 is accessible. The index 134 corresponds to an index of a corpus of secured hierarchical documents. There could be a common index 134 regardless of the security levels. Alternatively, there could be a separate index for each security level and/or encrypted layer. Also, there could be different indexes for different document types and/or document sources. The index may be stored in the data repository 50 or any other suitable database, data structure (e.g., fusion stream) and/or server. Separate data repositories or indexing systems (e.g., servers) may be used to store separate indexes, where each data repository (or indexing system) is associated with a level of trust, and each index can have a security clearance associated therewith based on the level of trust. For example, one data repository having a level of trust suitable for storing top secret information may be used to store one or more indexes that include information classified as top secret or lower, while another data repository having a level of trust suitable for storing confidential information may be used to store in an index information classified as confidential. By way of another example, one data repository having a level of trust suitable for storing secret information may be used to store an index that include information classified as secret for the DEA, and another repository having a level of trust suitable for storing secret information may be used to store an index that include information classified as secret for the FBI.

The data ingestion process 110 can be repeated numerous times on a large corpus of hierarchal documents to build-up the index(es) 134.

Figure 7A:
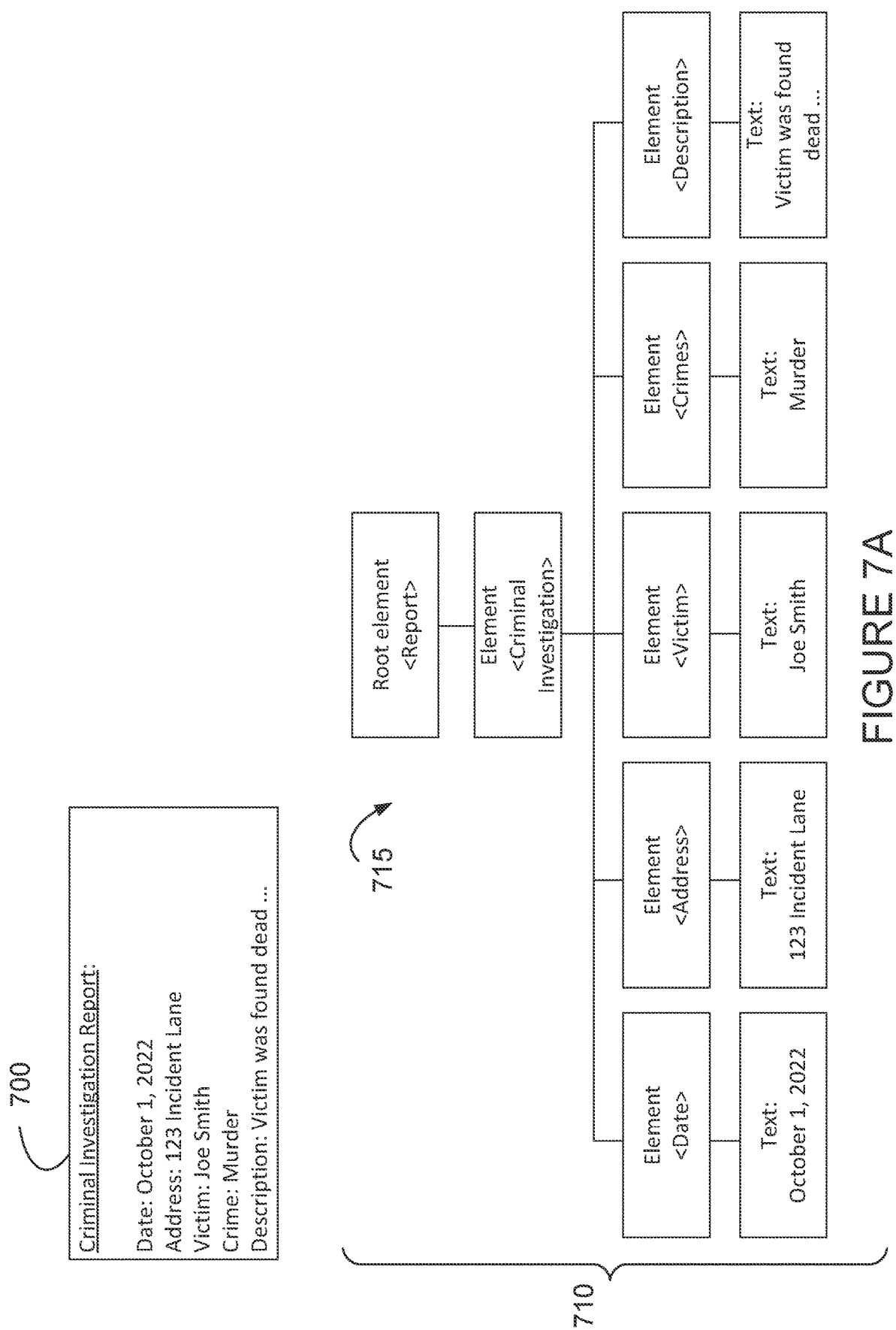
FIG. 7A is a schematic diagram illustrating an example hierarchical document and the corresponding nodes of the hierarchical document in a tree-like structure.

With reference to FIGS. 7A, 7B, 7C and 7D, a simplified and non-limiting example of securing and indexing a hierarchical document is illustrated. As shown in FIG. 7A, an incoming criminal investigation report 700, which is one example of a hierarchical document 102, is processed to identifying a plurality of nodes 710 in a tree-like structure 715. The hierarchical document 700 is marked-up with semantic information such that it can be interpreted to identifying the nodes 710. The hierarchical document 700 is formatted according to a known schema, for criminal investigation reports, which specifies which nodes are in the document and what type of information is stored in each node and how nodes may reference other nodes.

Figure 7B:
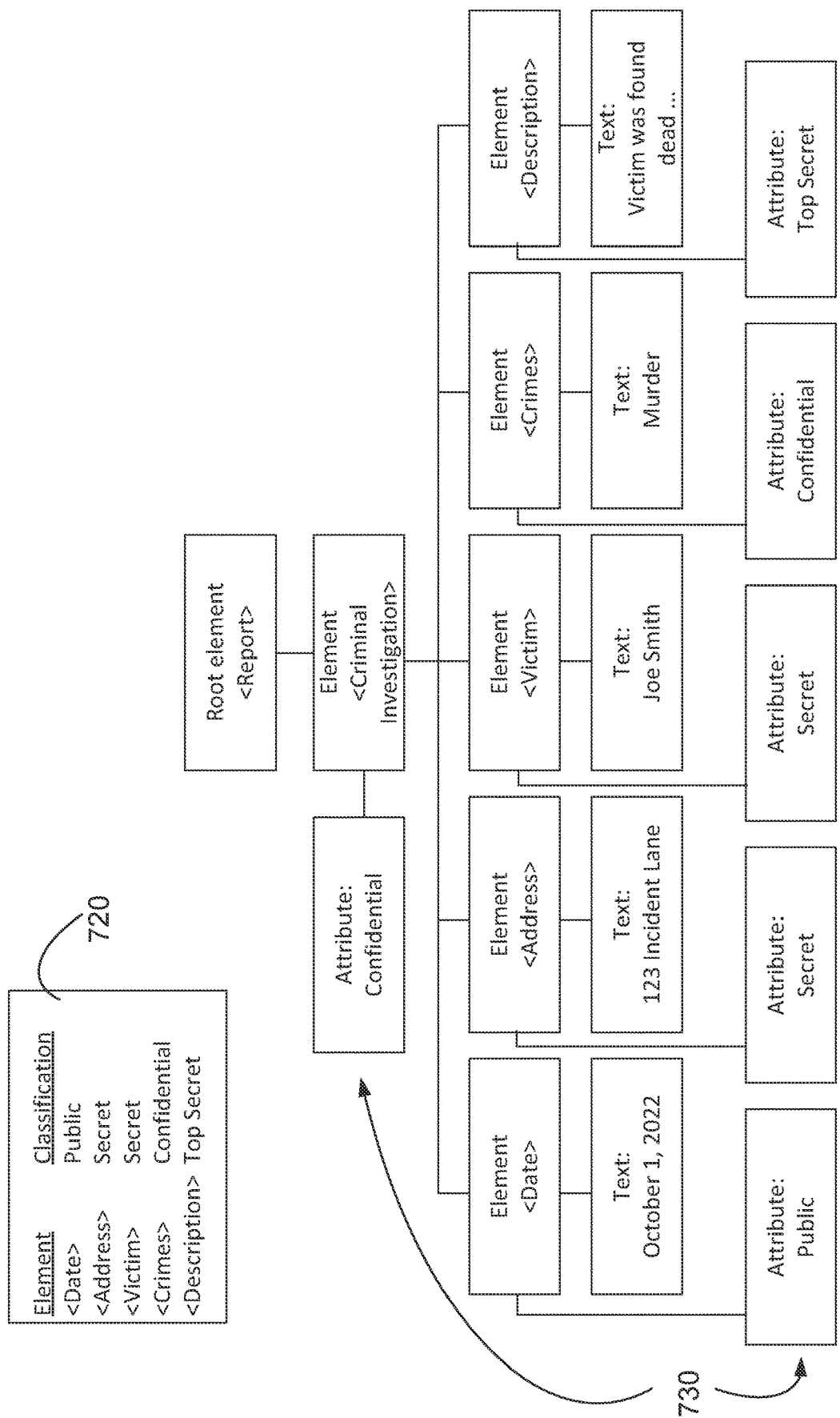
FIG. 7B is a schematic diagram illustrating an example of applying security labels to a hierarchical document from a security policy, in accordance with one or more embodiments.

As shown in FIG. 7B, a security policy 720 is applied to the nodes 710 of the hierarchical document 700 to label the nodes with security labels 730. In this example, the security policy 720 is document-type specific for criminal investigation reports. The security policy 720 for criminal investigation reports has been created by a security policy administrator to apply security labels to known nodes formatted in a specific manner. In this example, the security policy 720 is also document-source specific, as it originates from a specific law enforcement agency associated with the security policy 720. The security policy 720, in this example, is identified as one specific for this document type and source from among multiple available security policies specifying different document types and sources. The security labels 730 include security levels for public, confidential, secret and top secret. The security labels 730 are applied to the nodes 710 based on looking up the node name elements of the nodes 710 in the security policy 720 and mapping the classifications assigned to each node name element in the policy 720 to corresponding nodes in the document 700. The security labels 730 can read down from a parent node to a child node, but a child node's label would not read up to its parent node. As illustrated, the parent node <Criminal Investigation> is labelled confidential and its child node <Date> is labelled public, inherits the security label of confidential, but the parent node <Criminal Investigation> does not inherit the public security label of its child.

Figure 7C:
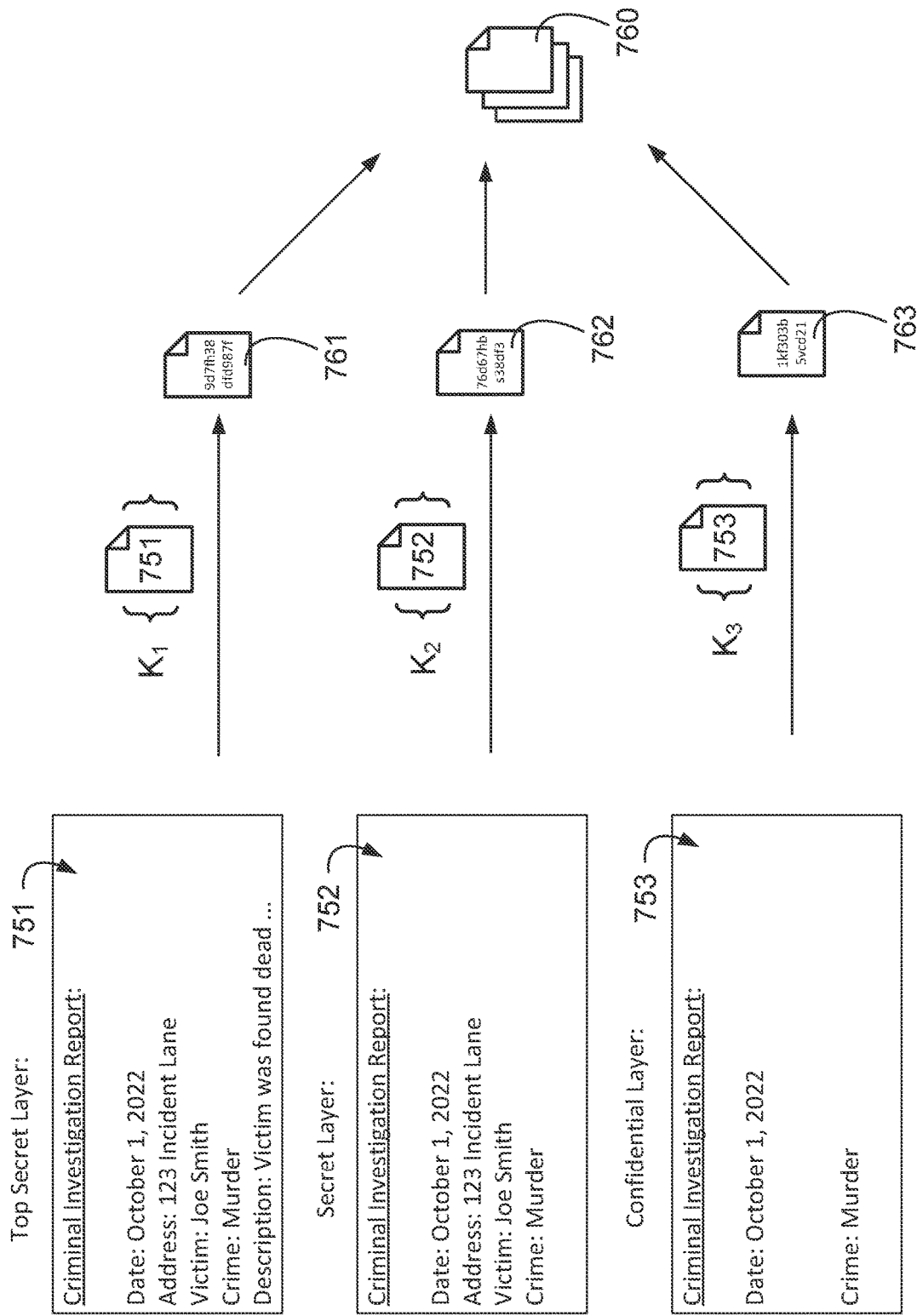
FIG. 7C is a schematic diagram illustrating an example of layers of a hierarchical document being cryptographically segregated to generate the secured hierarchical document, in accordance with one or more embodiments.

As shown in FIG. 7C, the hierarchical document 700 is separated into different layers 751, 752 and 753 of sensitive information visible at each layer. The top secret layer 751 includes sensitive information at the top secret level and lower. The secret layer 752 includes sensitive information at the secret level and lower. The confidential layer 753 includes sensitive information at the classified level and lower. Each layer is encrypted with a separate encryption key, which in this example are separate public encryption keys K1, K2 and K3 to generate a secured hierarchical document 760 having encrypted layers 761, 762 and 763. In particular, the nodes of the hierarchical document 700 are separated into layers 751, 752, 753 according to the security labels applied to each node. In this example, nodes labelled top secret are lower are encrypted with a first encryption key K1, nodes labelled secret and lower are encrypted with second encryption key K2, and nodes labelled confidential and lower are encrypted with a third encryption key K3. The secured hierarchical document 760 is stored to the memory of the data repository 50.

Figure 7D:
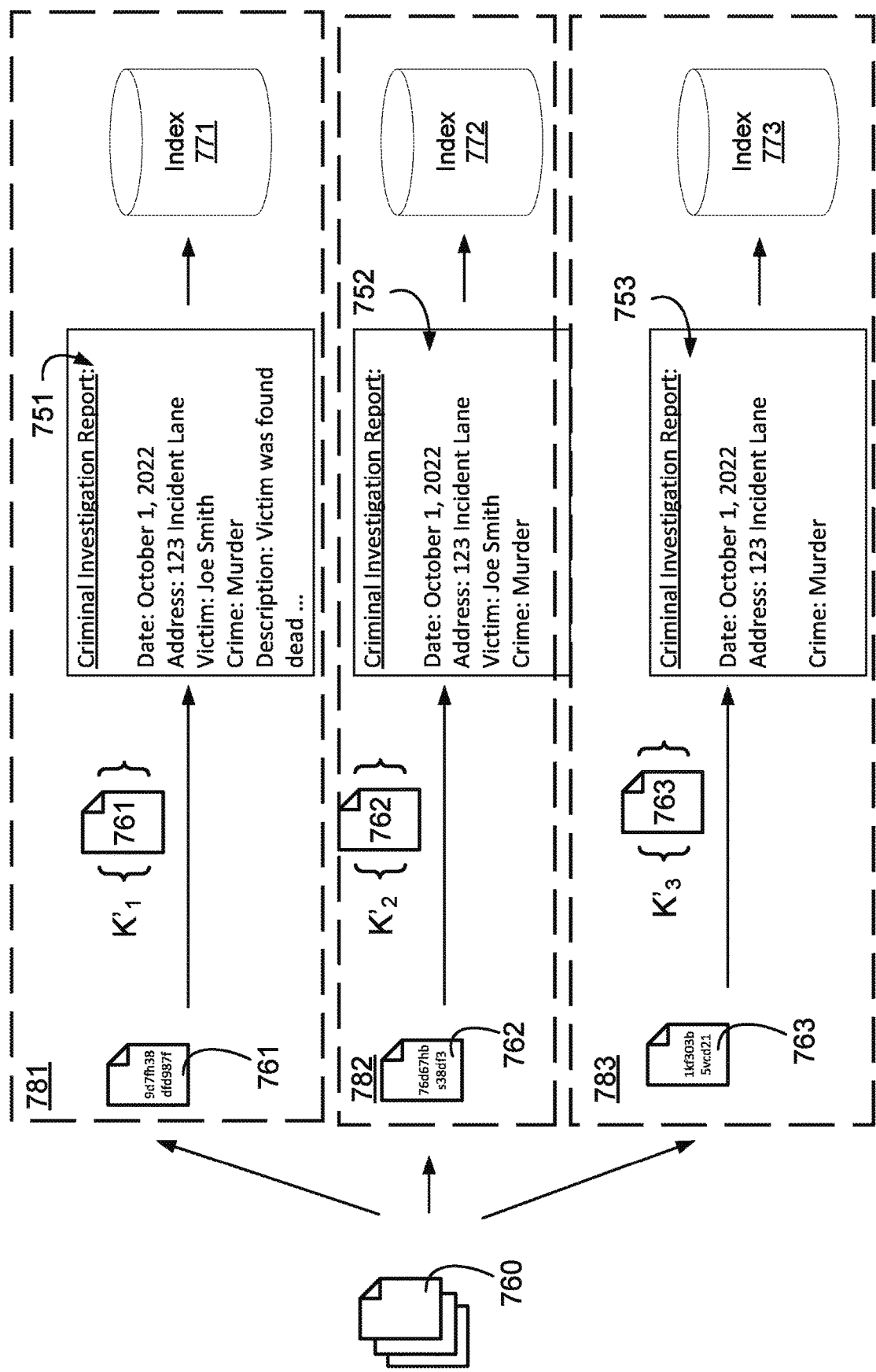
FIG. 7D is a schematic diagram illustrating an example of the secured hierarchical document being indexed, in accordance with one or more embodiments.

As shown in FIG. 7D, the secured hierarchical document 760 is also stored in indexes. In this example, example, each encrypted layer 751, 752, 753, corresponds to a respective index 771, 772, 773. The secured hierarchical document 760 is stored to the indexes 771, 772, 773 in plaintext. It is noted that the number of indexes and how the indexes are created depend on the level of trust in the server or database on which the indexes reside, and as such, in other examples, the indexes may be created with no relationship to the security labels and/or layers. In the illustrated example, each index resides on a separate server 781, 782, 783, where the servers have corresponding levels of trust. In this example, the first server 781 has a level of trust to store top secret information, the second server 782 has a level of trust to store secret information, and third server 783 has a level of trust to store confidential information. Each server receives the secured hierarchical document 760, and has the corresponding decryption key, which in this example are separate private encryption keys K'1, K'2 and K'3, and decrypts the respective layers to obtain the plaintext to store to the respective indexes 771, 772, 773 as sensitive information. The plaintext sensitive information of each layer can include the nodes and corresponding security labels, such that a given layer of the security-labelled (and/or pseudonymized) hierarchical documents can be recreated. Each encrypted layer may comprises meta-data. The meta-data may indicate the level of clearance of information encrypted in the encrypted layer and/or may indicate the encryption key used to generate the encrypted layer so each server 781, 782, 783 knows which decryption key to use to decrypt the encrypted layer.

Policy Creation Process

Referring back to FIG. 2, a user that is authenticated and authorized can create the security policies 126 as part of the policy creation process 130, and this user is referred to as the security policy administrator. The security policy administrator interacts with a user interface 122 to create policies with a policy generation module 124 that generates the security policies 126 that are used in applying the security labels, the pseudonymization, and/or the crypto-segregation, discussed above. The security policy administrator creates these security policies 126 to define how security labels are to be applied to documents from a given source or given type, how pseudonymization is to be applied, and how crypto-segregation is to be applied, which ultimately defines who can access certain types of data. The security policy administrator may create the policies based on the known schema or known mark-up of the documents that it expects to receive. For example, a template hierarchical document may be received, which can be processed to identify the different nodes that would be in expected future hierarchical documents of that type and/or source. The security policy administrator may assign, via the user interface 122, security labels to each identified node of the template, which is then used to create the security policy for that type and/or source of hierarchical documents.

Query Process

Continuing with reference to FIG. 2, a user that is authenticated and authorized can query the index 134 as part of a query process 140 to receive a result set of secured hierarchical documents. The user interacts with a user interface 142 to cause a query to be generated with a query module 144. The query generated includes the search terms specified by the user and may include the user's security clearance 146. The query module 144 queries the index 134, and a result set of secured hierarchical documents 148 are returned. The results set 148 is filtered by the result set processing module 160 and according to the user's security clearance 146 to remove any hierarchical documents with a security clearance that exceeds the user's security clearance 146 and/or the redact any information labelled at a security clearance that exceeds the user's security clearance 146. The result set of secured hierarchical documents 148 can be relabelled to form a relabelled result set of secured hierarchical documents 150. The relabelled result set of secured hierarchical documents 150 (or results set 148, when not relabelled) are redacted to form a redacted result set of secured hierarchical documents 152. The relabelling of the result set may be for reclassifying the result set. The query is logged by a query log module 162. This can include applying a security label to the log entry and indexing the query event in an index 170.

The index 134 queried by the user, may associate the plaintext sensitive information stored in the index 134 with the corresponding secured hierarchical documents 180. In particular, the search terms specified by the user in the query may match against plaintext sensitive information stored in the index 134 that references to one or more secured hierarchical documents stored in the data repository 50. The one or more secured hierarchical documents can then be obtained using this association/reference. The encrypted layer corresponding to the user's security clearance 146, or accessible by the user's security clearance 146, can be included in the result set provided to the user. The encrypted layer corresponding to the user's security clearance 146 can be decrypted with the corresponding decryption key to further redact any information therein and then be encrypted before being provided to the user. Alternatively, the plaintext sensitive information stored in the index 134, and corresponding to documents, that matches the search query may be obtained and used to generate the result set by recreating the documents.

By way of an example, and continuing with the example of FIGS. 7A to 7D, the result set could include the hierarchical document 760. In this example, the user has a security clearance level of secret and the user has queried the index 771, which contains documents at a top secret level. The encrypted layer 761 may be decrypted with the decryption key K'3 to obtain the decrypted layer 751. However, the decrypted layer 751 contains top secret information which is redacted by removing the nodes labelled as top secret and then this redacted hierarchal document is included in the redacted result set that is provided to the user. This redacted hierarchal document can be encrypted with the public encryption key K2 to generated the secured hierarchal document that is included in the redacted result set that is provided to the user. As the user, in this example, has secret security clearance, the user is able to have the secured hierarchal document decrypted. For example, the user may have the private encryption key K'2 to decrypt the secured hierarchal document, which was encrypted with the encryption key K2. By way of another example, the user may interface with access control system 10 to have the secured hierarchal document in the redacted result set decrypted, as the access control system 10 can manage the encryption keys. For example, the access control system 10 may have a key vault for storing the encryption keys, and can used the meta-data of the encrypted layers to look-up which encryption key to use to decrypted a given encrypted layer. The key vault can be stored in the memory of the access control system 10 or may be an external component or computing entity.

The various modules and/or interfaces 114, 116, 118, 132, 122, 124, 126, 142, 144, 160, 160, 162 of the access control system 10 may vary depending on practical implementations and may combined, uncombined, and/or omitted when suitable to do so. Similarly, the illustration of the various modules and/or interfaces 114, 116, 118, 132, 122, 124, 126, 142, 144, 160, 162 being part of the processes 110, 120, 140 is for example purposes, and may vary depending on practical implementations.

It should be appreciated that the hierarchical access control system 10 and the processes and methods described herein may allow for a fine grained information security/access control solution that uses cryptographic segregation for controlling who can access certain data within documents.

Example Operating Environment

Referring back to FIG. 1, the hierarchical document access control system 10 may be one or more computers, a server, a server cluster, a mainframe, a computing cluster, a cloud computing system, a distributed computing system, a portable computing device, or the like. The access control system 10 comprises at least one processing unit 14 and at least one memory 16 that has stored thereon program instructions 18 executable by the at least one processing unit 14 for performing the methods, processes, and/or the various embodiments described herein. As illustrated, the memory 16 that has stored thereon program instructions 18 executable by the processing unit 14 for performing the data ingestion process 110, the policy creation process 120, and/or the query process 140. The access control system 10 comprises one or more data interfaces, which may include one or more network interfaces, for communicating with any of the data source 104, the data repository 50, the computing device 60, the display device 80, and/or any other suitable device(s). Any communication between the access control system 10 and the data source 104, the data repository 50, the computing device 60, the display device 80, and/or any other suitable device(s), may be over one or more networks, which may comprises one or more public networks (e.g., the Internet) and/or one or more private networks. The network(s) may comprise one or more of a personal area network (PAN), local area network (LAN), mesh network, metropolitan area network (MAN), wide area network (WAN), wireless network, Wi-Fi network, Bluetooth network, cellular network and/or any other suitable network(s).

The data repository 50 stores data, such as the secured hierarchical documents, the policies and/or the index(es). The access control system 10 and the data repository 50 may be connected directly or via one or more networks, as mentioned elsewhere. In some embodiments, the access control system 10 comprises the data repository 50. In some embodiments, the data repository 50 is separate from the hierarchical document access control system 10. The data repository 50 may be a cloud-based storage system. The data repository 50 comprises computer-readable memory for storing data, such secured hierarchical documents 108, the index(es) 134, the security policies 126, and/or any other suitable information. The data repository 50 may be part of and/or accessible by a server or other computing device or system (e.g., a mainframe, a computing cluster, a cloud computing system, a distributed computing system, etc.) that is responsible for managing the index(es) in the data repository 50. There may be multiple data repositories for respectively storing different information (e.g., the different indexes). In some embodiments, a first data repository is used to store a particular index, and a second data repository is used to store the secured hierarchal documents corresponding to the sensitive information in the particular index.

The access control system 10 may be connected to the computing device 60 for communication therebetween, which may be over one or more networks, for example, as described elsewhere or a direct connection. The computing device 60 may be any suitable computing device such as a workstation, a portable computer, a tablet, smart phone, laptop or the like. The computing device 60 provides a user interface for interacting and/or controlling the hierarchical document access control system 10. The computing device 60 may allow a user to request or query information from the data repository 50, such as information stored in the indexes, among other things. The computing device 60 comprises one or more processing units and memory (not illustrated in FIG. 1) and may independently run software for performing the methods, or part thereof, described herein. Alternatively, the computing device 60 may function largely as a client, e.g., using a web browser or client application, while relying, for the most part, on the access control system 10 to perform methods described herein. The access control system 10 may provide a user interface for interacting therewith, in which case a computing device 60 is not necessary. The display device 80 may be a cathode ray tube display device, a light emitting diode (LED) display device, a liquid crystal display (LCD) display device, a touch screen, or any other suitable display device. The display device 80 may be connected to the computing device 60. The computing device 60 may comprise the display device 80. In embodiments where the computing device 60 is omitted, the display device 80 may be connected to the hierarchical document access control system 10, via the data interface(s) 12. In some embodiments, the access control system 10 may comprise the display device 80. The computing device 60 may comprise one or more data interfaces and/or one or more network interfaces for communicating with the hierarchical document access control system 10, the display device 180, and/or any other suitable devices. The computing device 60 and/or the access control system 10 may be connected to various input and/or output devices (e.g., keyboard, mouse, speakers, microphones, etc.) for interacting and/or controlling the computing device 60 and/or the hierarchical document access control system 10. While only one computing device 60 is illustrated in FIG. 1, multiple computing devices may connect and interface with the access control system 10.

The data source 104 may be any suitable computing device, system or server, and/or may be a data repository and/or other storage device. The access control system 10 and the data source 104 may be connected directly or via one or more networks, as mentioned elsewhere. In some embodiments, the access control system 10 comprises the data source 104. In some embodiments, the data source 104 is separate from the hierarchical document access control system 10. The data source 104 may be a cloud-based storage system. The data source 104 may comprises computer-readable memory for storing data, such as hierarchical documents. In some embodiments, the data source 104 is the computing device 60, where a user interacts with the access control system 10 to create the hierarchical document 102.

While FIG. 1 illustrates that the access control system 10 implements each of the data ingestion process 110, the policy creation process 120 and the query process 140, it should be understood that this need not be the case. In other embodiments, that there may be one or more access control systems 10 each configured to implement one or more of the ingestion process 110, the policy creation process 120 and the query process 140. For example, a common access control system may be used to implement the data ingestion process 110, the policy creation process 120, and a separate access control system may be provided for each index to implemented the query process 140.

Data Ingestion Method

Figure 3:
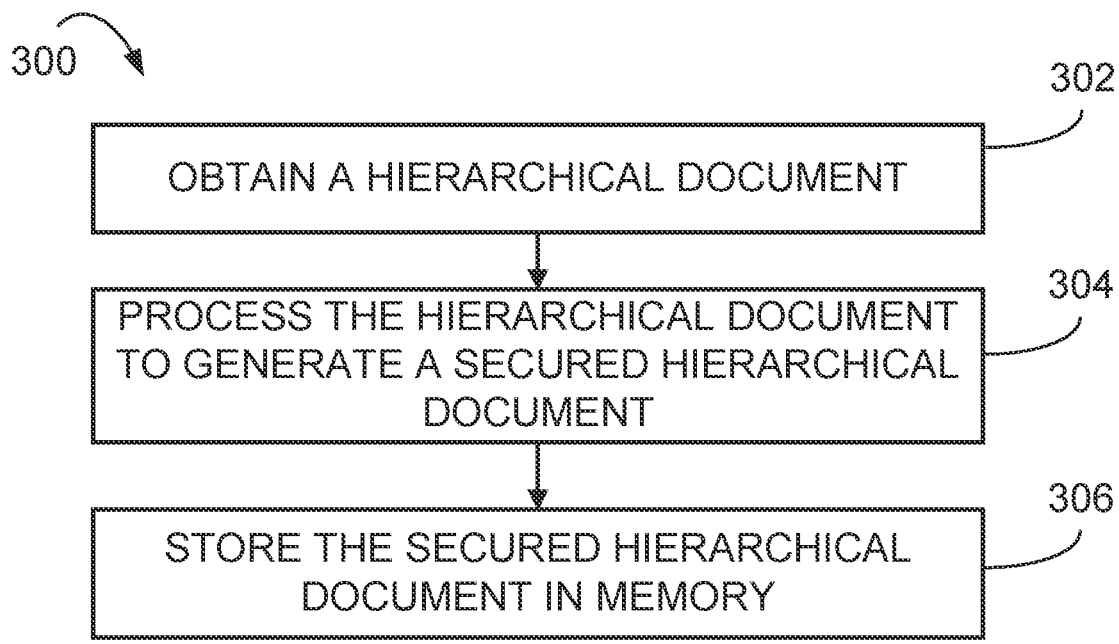
FIG. 3 is a flowchart illustrating an example method for generating a secured hierarchical document, in accordance with one or more embodiments.

With reference to FIG. 3, there is shown a flowchart illustrating an example method 300 for generating a secured hierarchical document. The method 300 is performed by a computing device, such as the hierarchical document access control system 10, or by any other suitable computing device, system or the like. In explanation of the method 300, any reference to the environment of FIG. 1 and the hierarchical document access control system 10 of FIG. 2, is made for example purposes, and the environment and/or the system's implementation, may vary depending on practical implementations.

At step 302, a hierarchical document 102 is obtained. The hierarchical document 102 has encoded therein data interpretable as a plurality of nodes in a tree-like structure. The hierarchical document 102 is obtained from a data source 104. Obtaining the hierarchical document 102 may include receiving, at the computing device performing the method, the hierarchical document over a network from the data source 104.

Figure 4:
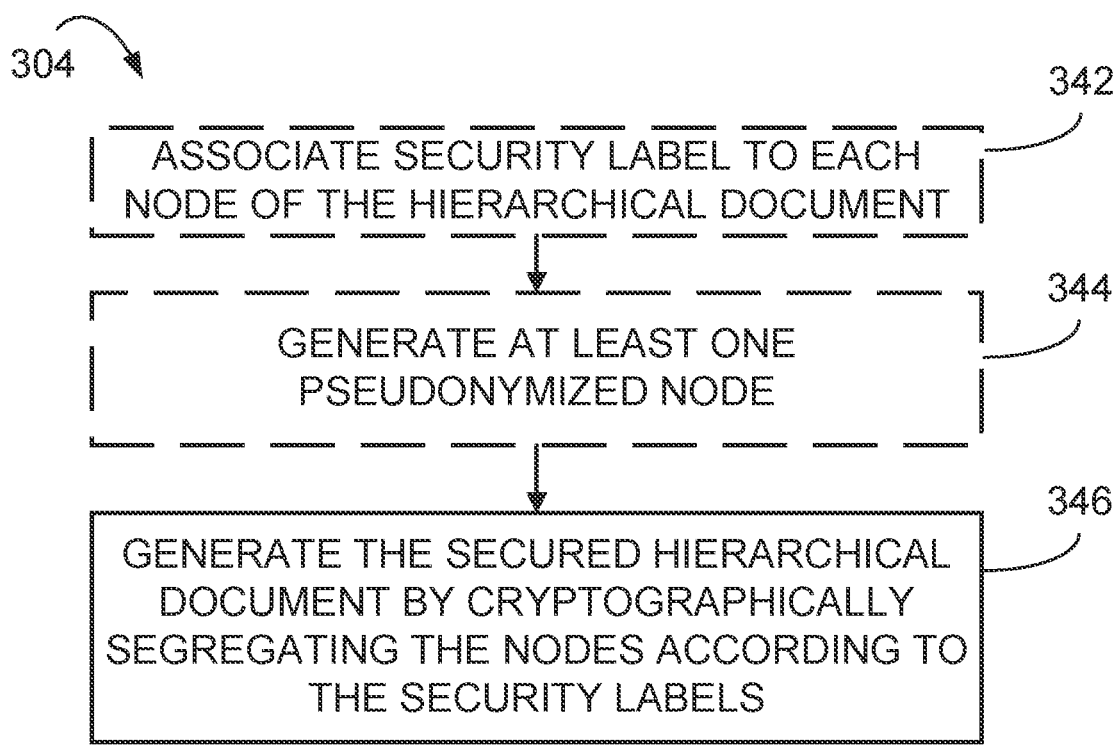
FIG. 4 is a flowchart illustrating an example of the step of processing the hierarchical document of the method of FIG. 3, in accordance with one or more embodiments.

At step 304, the hierarchical document 102 is processed to generate a secured hierarchical document 108. With additional reference to FIG. 4, there is shown a flowchart illustrating an example of step 304 of the method 300. Optionally, at step 342, a security label is associated to each node of the plurality of nodes in the hierarchical document 102. Alternatively, the hierarchical document 102 obtained at step 302 already has security labels associated therewith. The security label associated with each node corresponds to one of a plurality of security labels. The security labels indicate a level of sensitivity of the information contained in a given node and/or in one or more child nodes of the given node. Each security label of the plurality of security labels can include a respective security level of a plurality of security levels. For example, the security levels may be public, confidential, secret, and top secret. Some of the security labels may include a compartment and/or one or more attributes. In some embodiments, each security label in a subset of the plurality of security labels associated with one or more nodes of the plurality of nodes includes a compartment of a plurality of compartments. In some embodiments, each security label in the subset further includes at least one attribute. The at least one attribute may comprise at least one information type of a plurality of information types and/or at least one role of a plurality of roles.

In some embodiments, associating the security label to each node of the plurality of nodes is based on one or more policies. For example, each node of the plurality of nodes can be associated with a respective node name, and associating the security label to each node of the plurality of nodes can comprise mapping from the one or more policies a respective security label associated with the respective node name. In some embodiment, the one or more policies to apply are identified from the data source and/or the document type. For example, the hierarchal document 102 may be associated with a data source type, and when the hierarchal document 102 is received, the source type is looked-up in a table (e.g., a database) to identify the one or more policies that apply to documents from this source. The hierarchal document 102 may be associated with a document type, and when document type is looked-up in a table (e.g., a database) to identify the one or more policies that apply to documents of this type. Accordingly, in some embodiments, the method 300 further includes identifying a document type from the hierarchical document, and obtaining the one or more polices based on the document type, wherein the one or more policies apply for the document type. In some embodiments, the method 300 further includes identifying a source type of the hierarchical document from which the hierarchical document originated therefrom, and obtaining the one or more polices based on the source type, wherein the one or more policies apply for the source type. In some embodiments, a security labelled hierarchical document 105 is generated from the hierarchical document 102 to have the security labels applied therein. In some embodiments, a document-level security label is associated to the hierarchical document, which may be the security labelled hierarchical document 105 and/or the secured hierarchical document 108.

Optionally, at step 344, at least one pseudonymized node is generated. The at least one pseudonymized node corresponding to at least one node of the plurality of nodes having personally identifiable information therein modified. The personally identifiable information is modified such that the information is no longer personally identifiable. For example, age in changed to a range or indicates minor, full name is replaced with first name or first name with last name's first initial, address is changed to neighbourhood, etc. In some embodiments, at least one security label is associated to the at least one pseudonymized node based on one or more policies. In some embodiments, a pseudonymized hierarchical document 106 is generated from the hierarchical document 102 and/or the security labelled hierarchical document 105.

At step 346, the secured hierarchical document 108 is generated by cryptographically segregating the plurality of nodes according to the security label of each node. The secured hierarchical document 108 comprises a plurality of encrypted layers. Each encrypted layer of the plurality of encrypted layers comprises at least a subset of the plurality of nodes associated with the respective security level of the plurality of security levels. A given encrypted layer of the may comprises the subset of the plurality of nodes associated with a respective security level and any lower ranking security levels. Each encrypted layer of the plurality of encrypted layers is encrypted with a respective encryption key of a plurality of encryption keys. Each encryption key of the plurality of encryption keys is associated with one of the plurality of security levels. Each encryption key may correspond to a public encryption key, and which the corresponding private encryption key for the public encryption key is held or accessible by a server and/or database responsible for indexing information in secured hierarch documents.

Referring back to FIG. 3, at step 306, the secured hierarchical document 108 is stored in computer readable memory. Storing the secured hierarchical document 108 in memory can include indexing the secured hierarchical document in at least one index of a plurality of secured hierarchical documents. Indexing the secured hierarchical document can include indexing the secured hierarchical document in a plurality of indexes. Each index in the plurality of indexes may correspond to a respective security level. In some embodiments, indexing the secured hierarchical document comprises indexing the secured hierarchical document in a plurality of indexes, wherein each index in the plurality of index is associated with a level of trust for storing information at a given security clearance level of the plurality of security clearance levels. The secured hierarchical document 108 may be stored by a common server that is responsible for managing the index and corresponding secured hierarchical documents. Indexing the secured hierarchical document can comprise decrypting the one or more encrypted layers to obtain the plaintext sensitive information contained therein, which is then stored to the corresponding index.

Search/Query Method

Figure 5:
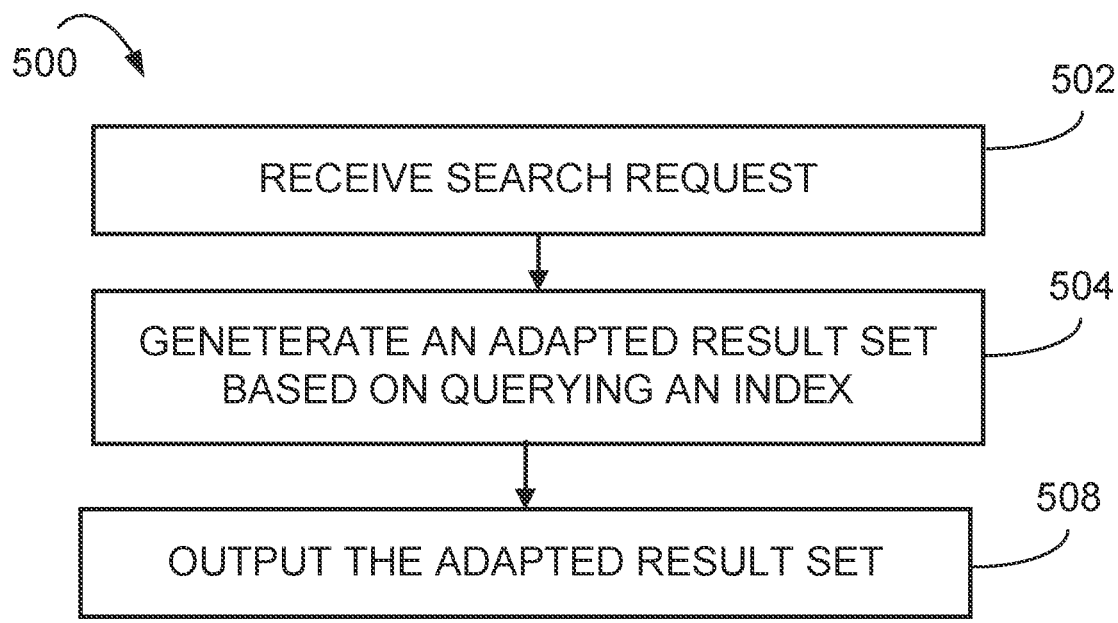
FIG. 5 is a flowchart illustrating an example method for searching a corpus of documents, in accordance with one or more embodiments.

With reference to FIG. 5, there is shown a flowchart illustrating an example method 500 for searching a corpus of documents with different portions have different security levels. The method 500 is performed by a computing entity having access to the corpus and an index of the corpus, such as the hierarchical document access control system 10, or by any other suitable computing device, system or the like. The computing entity is trusted to have access to the plaintext sensitive information in the index generated by indexing the documents therein. In explanation of the method 500, any reference to the environment of FIG. 1 and the hierarchical document access control system 10 of FIG. 2, is made for example purposes, and the environment and/or the system's implementation, may vary depending on practical implementations. The method 500 may be performed after the method 300 has been performed multiple times to generate at least one index.

At step 502, a search request is received from a computing device 60 associated with a user having a security clearance. The security clearance of the user defines one or more security levels of data that the user is authorized to access. The search request can include one or more search terms. The search request may include information such as the type of documents to search, which index to search, specify to search document from a given source, etc. The request may include the user's security clearance. Alternatively, the user's security clearance may be known to the computing entity, for example, by previous authentication. The search request may be provided a part of a communication request that includes a token that indicates the user's security clearance and/or that the user is authorized to search the particular index of sensitive information. In some embodiments, the security level correspond to a defined straight-line hierarchy (e.g., confidential, secret, top secret). In some embodiments, the security level does not necessarily correspond to a defined straight-line hierarchy. For example, one security level could indicate a classification (e.g., secret) for one group (e.g., FBI) and another security level could indicate the same classification (e.g., secret) for another group (e.g., DEA), which would correspond to two different security levels. In some embodiments, the information of the index comprises information at a plurality of security clearance levels, and at least one security clearance level of the plurality of security clearance levels is not one of the one or more security levels of data that the user is authorised to access.

At step 504, an adapted result set of documents adapted to the security clearance of the user is generated by querying the index based at least in part on the search request to identify documents corresponding to the search request and compiling the portions of the identified documents that are associated with the one or more security levels of data that the user is authorized to access. The identified documents can correspond to the search request when one or more search terms of the search request are found in one or more of the identified documents. In some embodiments, generating the adapted result set includes redacting portions of the identified documents having information at a security level not within the one or more security levels of data that the user is authorised to access. In some embodiments, the redacting is based on one or more security labels associated with one or more nodes in the one or more identified documents. For example, if a node is labelled top secret and the user's clearance level is secret, this node is redacted. In some embodiments, the redacting includes removing from the identified documents at least one document having a document-level security label at a security level not within the one or more security levels of data that the user is authorised to access. For example, if a document is labelled secret and the user's clearance level is confidential, this document is removed or is not include in the identifier documents.

Figure 6:
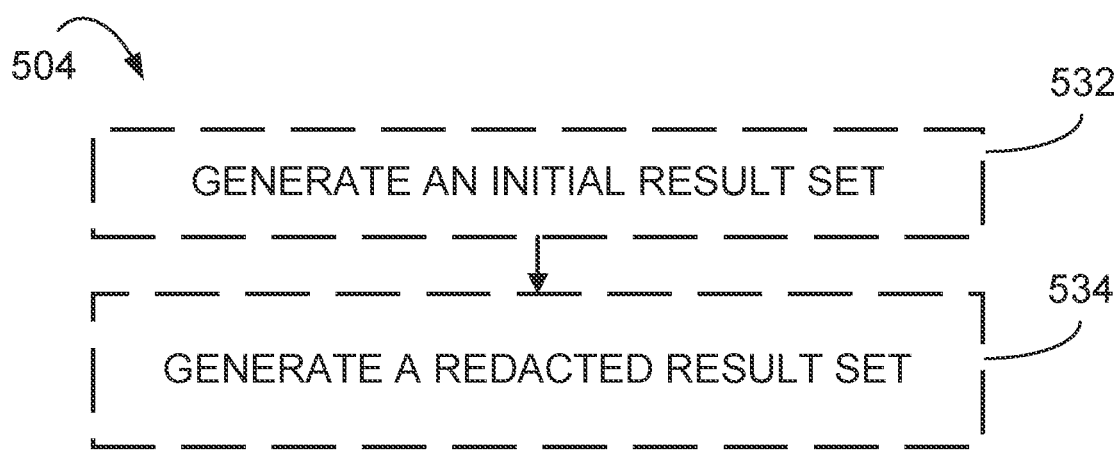
FIG. 6 is a flowchart illustrating an example of the step of generating the adapted result set of the method of FIG. 5, in accordance with one or more embodiments.

With additional reference to FIG. 6, there is shown a flowchart illustrating an example of optional steps of the step 504 of the method 500 of generating the adapted result set of documents. At step 532, in some embodiments, an initial result set of documents is generated by said querying the index based on the search request. At step 534, in some embodiments, a redacted result set of documents is generated from the initial result set of document. The adapted result set corresponds to, or is formed from, the redacted result set. In some embodiments, the redacted result set is generated by redacting the initial result set to omit the portions of the identified documents having information at the security level not within the one or more security levels of data that the user is authorised to access. In some embodiments, the redacted result set is generated by removing from the initial result set the at least one document in the initial result set having the document-level security label at the security level not within the one or more security levels of data that the user is authorised to access. Accordingly, the generating of the adapted result set at step 504 may be a single pass implementation that selects the portions of documents and combines to generate the adapted result set or may be a multiple pass implementation where a initial result set is obtained and is modified to generate the adapted result set from the redacted result set and/or relabelled result set.

In some embodiments, generating the adapted result set at step 504 of FIG. 5 comprises obtaining at least one secured hierarchical document comprising a plurality of encrypted layers from a data repository based on at least one association in the index that maps plaintext sensitive information therein to the at least one secured hierarchical documents in the data repository. For example, the query can be generated based on the search request to include the search terms specified in the search request in a format suitable for querying the index (e.g., formatted into SQL). Gathering the result set can include obtaining one or more secured hierarchical documents from a data repository based on one or more associations in the index that maps the sensitive information therein to the one or more secured hierarchical documents in the data repository. In some embodiments, generating the redacted result set includes removing information within at least one of the one or more secured hierarchical documents. The secured hierarchical documents or specific encrypted layers can be decrypted to access the nodes and corresponding security labels. The information removed may based on one or more security labels associated with one or more nodes in the one or more secured hierarchical documents. For example, if the user's security level is secret and a given node is labelled as top secret, that node can be redacted.

In some embodiments, generating the adapted result set at step 504 of FIG. 5 includes relabelling at least one of the portions of at least one of the identified documents. The relabelling may be of the initial result set for reclassifying the initial result set. For example, the user may have the security clearance to modify the classification of documents or portions therein, and in such case a security label of a given node at one level may be modified to another level. For instance, one or more nodes may be relabelled to reclassify the node(s). For example, a top secret node could be reclassified as secret, by a user authorized to do so. In some embodiments, generating the adapted result set includes redacting information from the identified documents without any indication in the adapted result set that such redacting has occurred. The initial result set may be obtained and relabelled to generate the relabelled result set. The relabelled result set may then be redacted. In other words, the result set that is redacted at step 534 may be the relabelled result set, when such is the case.

At step 508, the adapted result set is output. It can be transmitted to the computing device 60 associated with the user. It can be output for display on the display device 80. It can be output for storage to computer readable memory.

In some embodiments, the method 500 comprises logging a query event corresponding to said querying of the at least one index as a log entry in computer-readable memory. In some embodiments, the method comprises applying a security label to the log entry prior to storing in the computer-readable memory. The security label applied to the log entry is for assigning a security level to the log entry to that of the query. The security label applied to the log entry may correspond to the security level of the user. The security label applied to the log entry may be based on the results of the query, for example, if the results include documents or portions of documents not within the one or more security levels of data that the user is authorised to access, the security label applied may include the security level(s) of the results omitted in order to log what has been omitted. In some embodiments, logging the query event comprises indexing the log entry in an index of log entries. The indexing of the log entry in the index of log entries may be based on the security level of the log entry. There may be multiple indexes for log entries each having different security levels associated therewith. For example, a log entry labelled as secret may be indexed in an index associated with log entries of secret (and optionally lower), while a log entry labelled as top secret may be indexed in an index associated with log entries of top secret.

The order of the steps of the method(s) 300 and/or 500 may vary depending on practical implementations and when suitable to change the order. Similarly, when suitable, the various steps of the method(s) 300 and/or 500 described herein may be combined, uncombined, and/or omitted.

Example Computing Device Implementation

Figure 8:
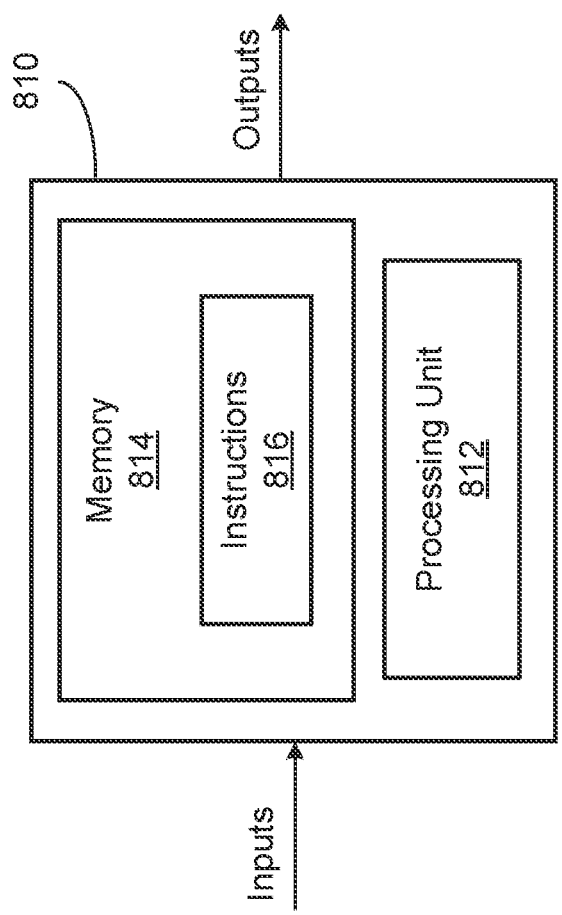
FIG. 8 is a schematic diagram of an example computing device, in accordance with one or more embodiments.

With reference to FIG. 8, the method 300 and/or 500 may be implemented by one or more computing devices, such as a computing device 810 comprising a processing unit 812 and a memory 814 which has stored therein computer-executable instructions 416. Each of the system 10, the computing device 60, the data source 104, and/or the data repository 50 may each be implemented by and/or comprise at least one computing device, such as the computing device 810.

The processing unit 812 may comprise any suitable devices configured to implement the method 300 and/or 500 such that instructions 816, when executed by the computing device 810 or other programmable apparatus, may cause the functions/acts/steps performed as part of the method 300 and/or 500 as described herein to be executed. The processing unit 812 may comprise, for example, any type of general-purpose microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof. The processing unit 812 may be referred to as a "processor".

The memory 814 may comprise any suitable known or other machine-readable storage medium. The memory 814 may comprise non-transitory computer readable storage medium, for example, but not limited to, an electronic, magnetic, optical, electromagnetic, infrared, or semiconductor system, apparatus, or device, or any suitable combination of the foregoing. The memory 814 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 814 may comprise any storage means (e.g., devices) suitable for retrievably storing machine-readable instructions 816 executable by processing unit 812. The memory of the data repository 150 may be implemented according to the memory 814, and may comprise any suitable known or other machine-readable storage medium.

The methods and systems described herein may be implemented in a high level procedural or object oriented programming or scripting language, or a combination thereof, to communicate with or assist in the operation of a computer system, for example the computing device 810. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 812 of the computing device 810, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A computer-implemented method for generating a secured hierarchical document, the method comprising:
   obtaining a hierarchical document having encoded therein data interpretable as a plurality of nodes in a tree-like structure;
   processing the hierarchical document to generate the secured hierarchical document, wherein said processing includes:
   associating a security label to each node of the plurality of nodes in the hierarchical document based on one or more policies, the security label associated with each node corresponds to one of a plurality of security labels, each security label of the plurality of security labels includes a security clearance level of a plurality of security clearance levels;
   identifying a document type of the hierarchical document or a source type of the hierarchical document, the source type corresponding to a data source from which the hierarchical document originated, and obtaining the one or more policies based on the document type or the source type, wherein the one or more policies apply for at least the document type or the source type; and
   generating the secured hierarchical document by cryptographically segregating the plurality of nodes according to the security label of each node, the secured hierarchical document comprising a plurality of encrypted layers, each encrypted layer of the plurality of encrypted layers comprises a subset of the plurality of nodes associated with at least a respective security label of the plurality of security labels and encrypted with a respective encryption key of a plurality of encryption keys; and
   storing the secured hierarchical document in computer-readable memory.

2. The method of claim 1, wherein each security label in a subset of the plurality of security labels associated with one or more nodes of the plurality of nodes includes a compartment of a plurality of compartments.

3. The method of claim 2, wherein each security label in the subset further includes at least one attribute, wherein the at least one attribute comprises at least one information type of a plurality of information types and/or at least one role of a plurality of roles.

4. The method of claim 1, wherein associating the security label to each node of the plurality of nodes is based on one or more policies.

5. The method of claim 4, wherein each node of the plurality of nodes is associated with a respective node name, and wherein associating the security label to each node of the plurality of nodes comprises assigning from the one or more policies a respective security label associated with the respective node name.

6. The method of claim 4, wherein the method further comprises:
identifying a document type from the hierarchical document; and
obtaining the one or more polices based on the document type, wherein the one or more policies apply for at least the document type.

7. The method of claim 4, wherein the method further comprises:
identifying a source type of the hierarchical document from which the hierarchical document originated therefrom; and
obtaining the one or more polices based on the source type, wherein the one or more policies apply for at least the source type.

8. The method of claim 1, wherein storing the secured hierarchical document comprises indexing the secured hierarchical document in at least one index of a plurality of secured hierarchical documents.

9. The method of claim 8, wherein indexing the secured hierarchical document comprises indexing the secured hierarchical document in a plurality of indexes, wherein each index in the plurality of index is associated with a level of trust for storing information at a given security clearance level of the plurality of security clearance levels.

10. The method of claim 1, wherein said processing further includes:
generating at least one pseudonymized node for the plurality of nodes, the at least one pseudonymized node corresponding to at least one node of the plurality of nodes having personally identifiable information therein modified.

11. The method of claim 10, wherein said processing further includes:
associating at least one security label to the at least one pseudonymized node based on one or more policies.

12. The method of claim 1, further comprising associating a document-level security label to the secured hierarchical document.

* * * * *